H. M. SPAHR.
SOIL TESTER.
APPLICATION FILED MAR. 2, 1917.

1,229,803.

Patented June 12, 1917.

UNITED STATES PATENT OFFICE.

HARRY M. SPAHR, OF BALTIMORE, MARYLAND.

SOIL-TESTER.

1,229,803.

Specification of Letters Patent.

Patented June 12, 1917.

Application filed March 2, 1917. Serial No. 151,961.

*To all whom it may concern:*

Be it known that I, HARRY M. SPAHR, a citizen of the United States, residing at Baltimore, in the State of Maryland, have invented certain new and useful Improvements in Soil-Testers, of which the following is a specification.

This invention relates to improvements in soil testers, and has for its object to provide a cheap, simple and efficient device for ascertaining the amount of lime or ground limestone contained in the soil being tested.

The invention consists of the novel construction and arrangement of the parts and combination of parts hereinafter more fully set forth in the following specifications and pointed out in detail in the appended claims.

In the accompanying drawings,—

Figure 1:
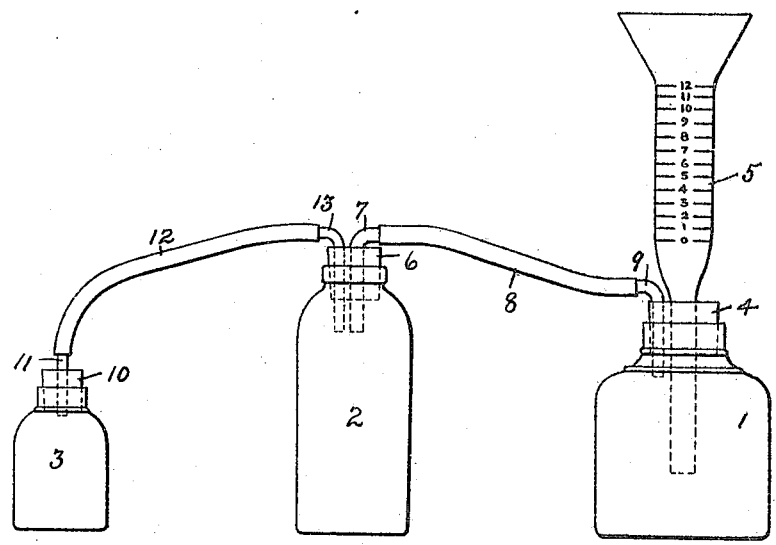
Figure 1 is a side elevation of my invention.
Figure 2:
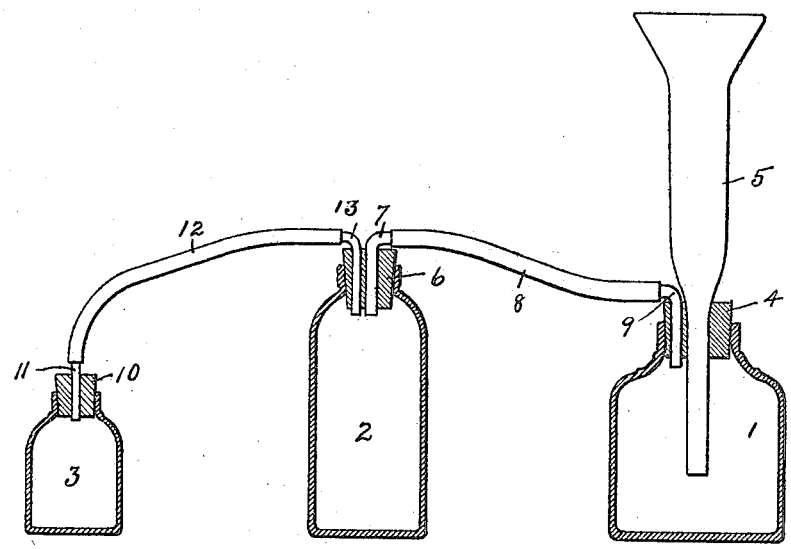
Fig. 2 is a vertical section of same.

Referring to the accompanying drawing, forming part of this specification, and in which like reference numerals designate like parts throughout the several views thereof, 1 designates the water container, 2 the soil container and 3 the acid container. The water container 1 is provided with a rubber stopper 4 through which the lower end of the gage 5 projects into the said container 1. The soil container 2 is provided with a rubber stopper 6 through which one end of the tubular joint 7 projects. Said soil container having communication with the water container 1 through the joint 7, tube 8 and joint 9, which latter has one end projecting through the stopper 4 and into the water container 1. The acid container 3 is also provided with a rubber stopper 10 through which the tubular joint 11 projects and said acid container has communication with the soil container 2 through the joint 11, the flexible tube 12 and the tubular joint 13 which latter projects through the stopper 6 and into the soil container 2. The flexible tube 12 permits of the acid container 3 being raised and tilted, independent of the soil container, so that the acid can flow from the acid container to the soil container.

The operation is as follows:

The water container is filled with water and the soil placed in the soil container 2. The proper amount of acid is then placed in the acid container 3 and the latter is then raised and tilted which causes the acid to flow through the tube 12 to the soil container 2, and as the said acid comes into contact with the soil if there is any lime in said soil the contact of the same with the muriatic acid causes the formation of gas which flows through the tube 8 to the water container 1 and the pressure of said gas in the water container forces the water up into the gage 5 indicating the amount of lime or ground limestone per acre contained in the soil being tested.

Having thus described my invention, what I claim is:

1. A soil tester comprising a water container, a gage having one end projecting into said water container, a soil container having communication with the water container, an acid container, and a flexible tube connecting the soil container and the acid container whereby the latter may be tilted independently of the soil tester.

2. A soil tester comprising a water container, a gage having one end projecting into said water container, a soil container having communication with the water container, an acid container outside the soil container having communication with and adapted to be tilted independently of the soil container.

3. A soil tester comprising a water container, a stopper for said water container, a gage having one end projecting through said stopper and into said water container, an angle joint having one end projecting through said stopper and into the water container, a soil container, a stopper for said soil container, two angle joints each of which has one end projecting through the stopper of the soil container, a tube connecting one of said angle joints of the soil container with the angle joint in the water container stopper, an acid container, a stopper for said acid container, and a flexible tube connecting one of the angle joints of the soil container with the acid container, whereby latter may be tilted independently of the soil container.

In testimony whereof I affix my signature in the presence of two witnesses.

HARRY M. SPAHR.

Witnesses:
CHAPIN A. FERGUSON,
THELMA BEWLERY.

Copies of this patent may be obtained for five cents each, by addressing the "Commissioner of Patents, Washington, D. C."